(12) United States Patent
Wang et al.

(10) Patent No.: US 8,446,423 B2
(45) Date of Patent: May 21, 2013

(54) METHODS AND DEVICES FOR PROCESSING A RASTER IMAGE

(75) Inventors: Jian Wang, Beijing (CN); Lei Yao, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 863 days.

(21) Appl. No.: 12/443,682

(22) PCT Filed: Sep. 25, 2007

(86) PCT No.: PCT/CN2007/002815
§ 371 (c)(1),
(2), (4) Date: Nov. 9, 2009

(87) PCT Pub. No.: WO2008/040185
PCT Pub. Date: Apr. 10, 2008

(65) Prior Publication Data
US 2010/0097390 A1   Apr. 22, 2010

(30) Foreign Application Priority Data
Sep. 30, 2006   (CN) .......................... 2006 1 0113561

(51) Int. Cl.
*G06T 1/00* (2006.01)
*G09G 5/00* (2006.01)
*G09G 5/02* (2006.01)
*G06F 15/00* (2006.01)
*G06F 17/00* (2006.01)
*H04N 1/40* (2006.01)
*G06K 9/00* (2006.01)
*G06K 9/40* (2006.01)
*G06K 9/64* (2006.01)
*G06K 9/36* (2006.01)

(52) U.S. Cl.
USPC ........... 345/589; 345/418; 345/581; 345/591; 345/630; 358/1.1; 358/1.9; 358/448; 358/450; 382/162; 382/254; 382/279; 382/284; 715/200; 715/277

(58) Field of Classification Search
USPC ................. 345/418, 581, 589, 591, 619, 630; 358/3.01–3.02, 515–519, 1.1, 1.9, 448, 450; 382/162, 254, 274, 276, 284; 715/200, 277
See application file for complete search history.

(56) References Cited

U.S. PATENT DOCUMENTS

2002/0054398 A1*   5/2002   Bloomquist et al. .......... 358/529
2009/0141972 A1*   6/2009   Weiner et al. ................. 382/163

FOREIGN PATENT DOCUMENTS

| CN | 1455332 A | 11/2003 |
| CN | 1513256 A | 7/2004 |
| CN | 1621942 A | 6/2005 |

*Primary Examiner* — Wesner Sajous
(74) *Attorney, Agent, or Firm* — Lathrop & Gage LLP (57) ABSTRACT

Disclosed are methods and devices for processing a raster image so that the white color filled in the raster image during building the raster image can be differentiated from that contained in the figure objects presented in the page, which will be inserted into the raster image later. The method comprises building the raster image and filling the raster image with a white color; and transferring the white color in a figure object described in a page and inserting the figure object into the raster image. In this way, the white color filled in the raster image during building the raster image can be differentiated from that contained in the figure objects presented in the page, which will be inserted into the raster image later.

14 Claims, 8 Drawing Sheets

FIG. 1

(Prior Art)

FIG. 2

(Prior Art)

FIG. 3

(Prior Art)

FIG. 4

(Prior Art)

FIG.5

(Prior Art)

METHODS AND DEVICES FOR PROCESSING A RASTER IMAGE

FIELD OF THE INVENTION

The present invention relates to the field of computer graphics or image processing, more particularly, to the raster image processing method and device.

BACKGROUND OF THE INVENTION

At present, the prepress technology has been realized in digitalization So that various software for processing computer graphics and images are widely used. In the prepress production, especially in the packaging fabrication, the make-up operation, such as the irregular make-up operation is common. In the make-up operation, a plurality of non-rectangular shapes, figures and/or images are jointly presented on one page and a logical or physical page description file is generated for the subsequent prepress, press and postpress processes.

The input in the make-up process is generally a page description file or a page description flow, such as the PostScript (PS) and the Portable Document Format (PDF). Pages described in these formats are rectangular. Furthermore, the results of these page description files by using a Raster Image Processor (RIP) are also rectangular.

Figure 1:
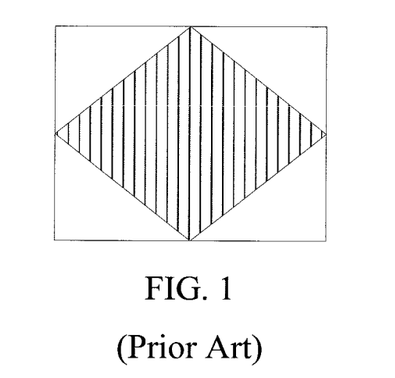
FIG. 1 is a schematic view of a page.

At present, there are two types of page description manners for a same page effect. The page effect shown in FIG. 1 can be taken as an example. According to the first page description manner, only one figure object is described, i.e. the diamond. According to the second page description manner, two figure objects are described. That is, a background rectangle with white color is firstly described, and then the diamond inserted into the background rectangle is described. As shown in FIG. 1, the background rectangle is an envelop rectangle of the diamond.

For the first and second page description manners, the RIP generates a preview of the page described in the received page description file or page description flow according to the following pseudocode.

```
error = RIP ( PDLFileName,    // name of a page description file
    default,                  // use a default gray-scale transferring
                              graph
    "all",                    // processing all the pages
    ...)                      // other input and output parameters of the
                              raster image
```

Figure 2:
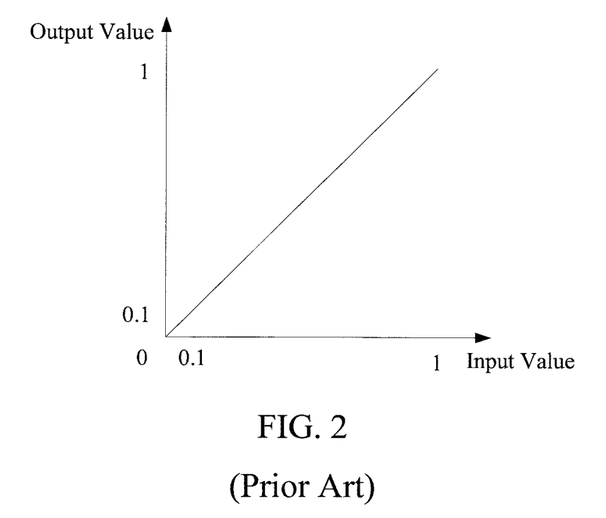
FIG. 2 is a schematic view of a default gray-scale transferring graph.

The default gray-scale transferring graph is shown in FIG. 2. Each component of the output color value is identical to the corresponding component of the input color value when the default gray-scale transferring graph is used. In the raster image process, the gray-scale transferring graph is delivered to the RIP as a parameter.

Figure 3:
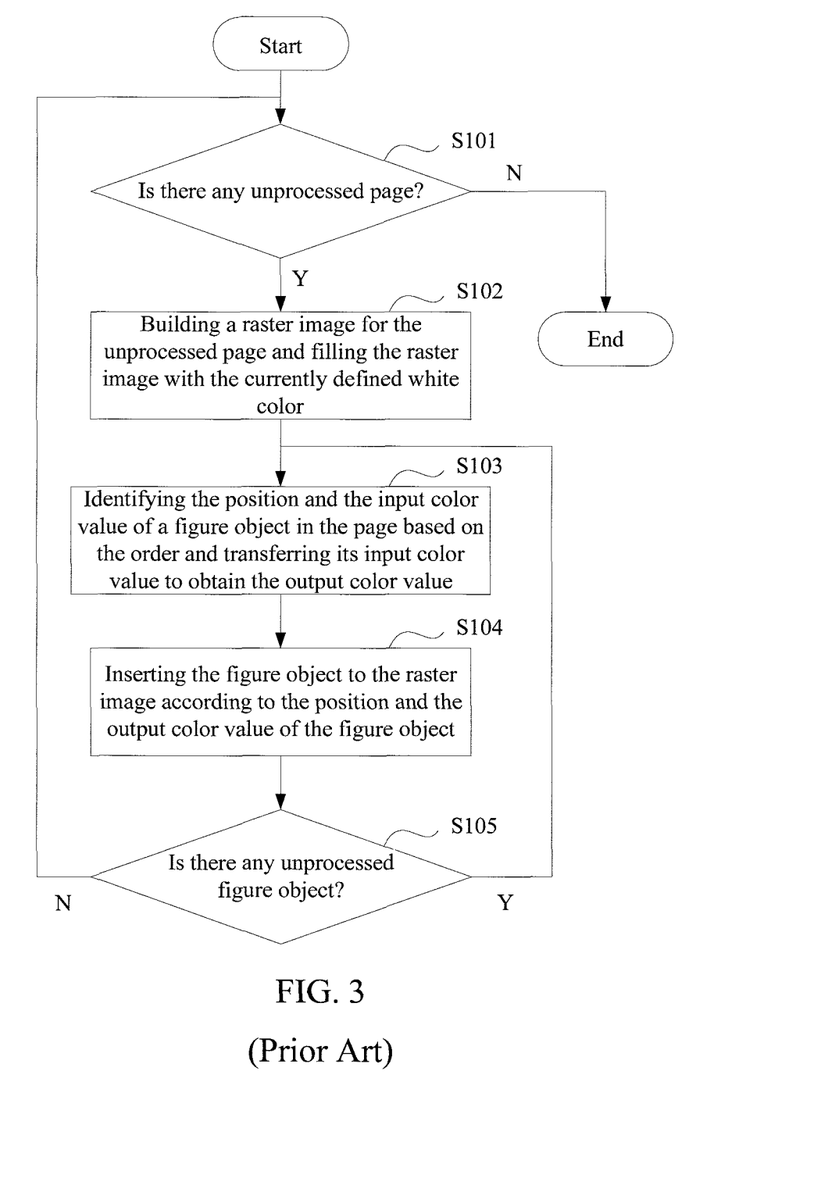
FIG. 3 is a flow chart of the raster image processing in the prior art.

The RIP starts a raster image process after receiving a page description file or a page description flow. The raster image process is shown in FIG. 3, which includes the following steps.

Step S101 is to determine whether an unprocessed page is contained in the page description file or the page description flow. If yes, the process turns to Step S102; otherwise, the process ends.

In Step S102, the RIP builds a raster image based on page information of an unprocessed page in the received page description file or page description flow and a color space for output, and fills the raster image with the currently defined white color.

The page information comprises the size of the page as well as the resolution required in the raster image process.

Step S103 is to identify the position and the input color value of a figure object in the page, based on the order of filling all the figure objects in the page. The order of filling is defined in the page description file or the page description flow. The input color value is transferred to obtain the output color value.

Since the default gray-scale transferring graph is used presenting the process, each component of the output color value is identical to the corresponding component of the input color value. Thus, the output value of the white color in the figure object will still present the white color.

Step S104 is to fill the raster image with the figure object according to the position and the output color value of the figure object.

Step S105 is to determine whether an unprocessed figure object is contained in the page. If yes, the process returns to Step S103; otherwise, the process returns to Step S101.

In view of the above, the RIP fills the whole raster image with the currently defined white color before filling the page with figure objects. Thus, after the page is processed, the white color filled in the raster image during building the raster image can not be distinguished from the white color in the figure objects in the page filled in the raster image afterwards. In addition, the computer software for processing graphics and images can use only two display manners. According to the first display manner, the colors filled in the raster image are directly displayed. That is, all the areas filled with colors in the raster image are directly displayed and not transparent. According to the second display manner, when a raster image is displayed, the white area in the raster image is transparentized compulsorily. That is, the white color areas in the image are transparent, and displayed in transparency. It can be understood that any other color may also be specified to be transparentized compulsorily. For illustration, the white color is specified in this disclosure. However, in the make-up process, a page sometimes extends into the interior of another page. According to each of the two page description manners, it is possible that the actual result obtained from the RIP could not be correctly displayed, the case of which will be described in detail below.

Figure 4:
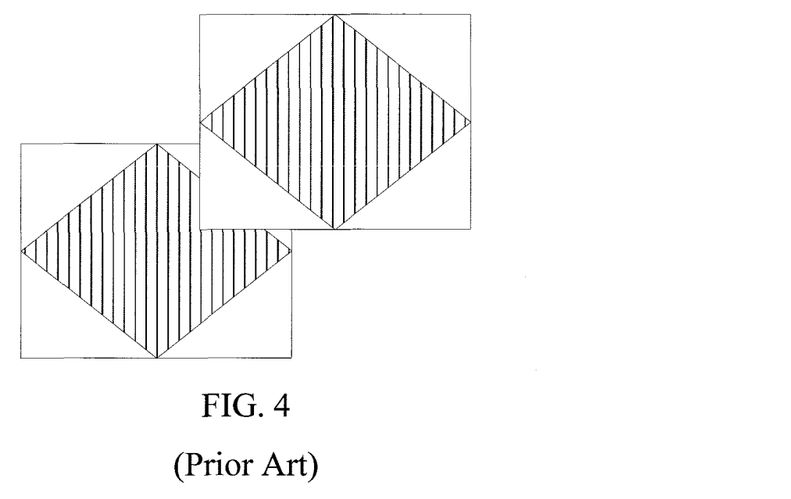
FIG. 4 is a schematic view of the effect of make-up.
Figure 5:
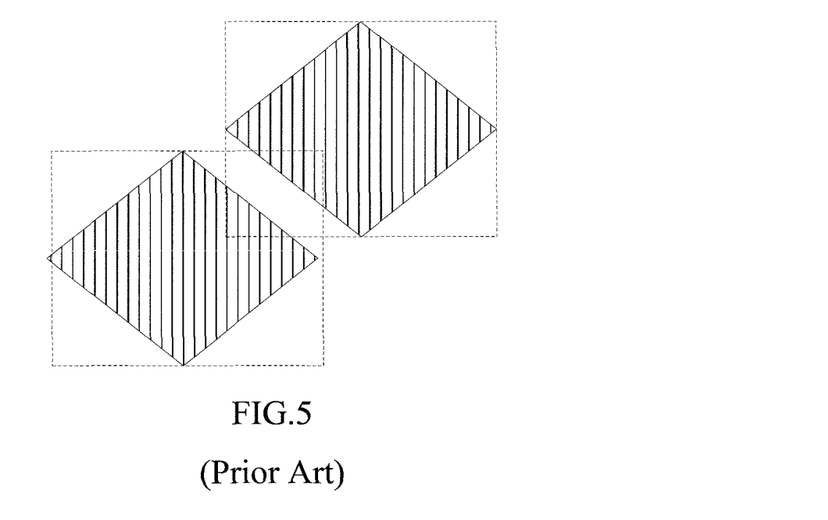
FIG. 5 is a schematic view of the effect of another make-up.

As to the first display manner, it is assumed that the first page description manner stated above is used for two pages in the make-up operation. The RIP fills the whole raster image with the currently defined white color before inserting figure objects into a page. For example, the figure object described in each of two pages is the diamond as shown in FIG. 1. Where an upper raster image extends into the interior of the diamond of a lower raster image, the displayed make-up result is shown in FIG. 4. That is, the upper raster image is filled with the white color, and it thus covers a part of the diamond in the lower raster image. Actually, in the page description file obtained from the make-up by the RIP, there are only two figure objects, i.e. the diamonds described in the two pages used for the make-up operation. Accordingly, the actual make-up result obtained by the RIP is shown in FIG. 5. It can be seen that the two diamonds do not overlap with each other. The displayed make-up result is not consistent with the actual make-up result obtained by the RIP.

Moreover, for the first display manner, during the make-up operation, since the upper raster image may cover the lower raster image, the user only can determine the positions of the figure objects made-up according to the shapes in the make-up operation, the practical situation of the page and his experience. The displayed result does not present the actual result correctly.

As to the second display manner, it is assumed that the second page description manner stated above is used for two pages in the make-up operation. For example, the figure object described in the each of two pages is the diamond as shown in FIG. 1. The page description file, which is actually obtained from the make-up operation by the RIP, describes the following four figure objects:

1. a white color envelop rectangle in the first page;
2. a diamond in the first page;
3. a white color envelop rectangle in the second page; and
4. a diamond in the second page.

Where an upper raster image extends into the interior of the diamond of a lower raster image, the displayed make-up result is shown in FIG. 4. That is, the upper raster image covers a portion of the diamond in the lower raster image. Since the white area is transparentized compulsorily for display, the displayed make-up result is shown in FIG. 5. It can be seen that the two diamonds are not covered with each other. Thus, the displayed make-up result is not consistent with the actual make-up result obtained by the RIP.

Furthermore, in the case of using the second display manner, if a white area is contained in the diamond, the white area will also be transparentized compulsorily so that the displayed result does not present the actual result correctly.

In view of the above, in the prior art, when a page is displayed by the RIP, the displayed result of the page dose not present the actual result correctly. Furthermore, the displayed make-up result is not consistent with the actual make-up result obtained by the RIP whatever which display manner of the two manners is used. The white color filled in the raster image during building the raster image can not be distinguished from the white color in figure objects in a page filled in the raster image afterwards.

SUMMARY OF THE INVENTION

It is to provide a raster image processing method and device for resolving the problem in the prior art that the white color filled in the raster image during building the raster image cannot be differentiated from the white color in the figure objects described in the page and inserted into the raster image later.

The provided method for processing a raster image, may comprises: building the raster image and filling the raster image with a white color; and transferring the white color in a figure object described in a page and inserting the figure object into the raster image.

Furthermore, the white color in the raster image may be compulsorily transparentized during the raster image is displayed.

Furthermore, the white color may be an absolute white color determined by an output color space.

Furthermore, after the figure object is inserted into the raster image, a currently defined white color may be restored to the absolute white color for processing a next page.

Furthermore, the raster image may be built according to page information of the page and an output color space.

Furthermore, the step of transferring the white color in a figure object described in a page may comprise: identifying a position and an input color value of the figure object described in the page; and transferring the input color value to obtain a corresponding output color value by using a transparency gray-scale transferring graph.

Furthermore, when the input color value is transferred to obtain a corresponding output color value by using a gray-scale transferring graph, other input color values may be also transferred to obtain corresponding output color values by using the gray-scale transferring graph.

Furthermore, the step of transferring the input color value to obtain a corresponding output color value by using a gray-scale transferring graph may comprise: transferring each component of the input color value by using respective gray-scale transferring graph to obtain each component of the output color value.

Furthermore, each component of an output value corresponding to any input value may be different from a corresponding component of the white color value in the output color space.

Furthermore, the step of transferring the white color in a figure object described in a page may comprise: identifying a position and an input color value of the figure object in the page; and using a set color value to serve as an output color value corresponding to the input color value equal to the white color value.

Furthermore, while the set color value is used to serve as the output color value corresponding to the input color value equal to the white color value, input color values different from the white color value may be directly served as corresponding output color values.

Furthermore, each component of the set color value may be different from a corresponding component of the white color value in the output color space.

The provided device for processing a raster image, comprising: a building module for building the raster image and filling the raster image with a white color; and a filling module for transferring a white color in figure objects described in a page and inserting the figure objects into the raster image built by the building module.

Furthermore, the device may further comprise a displaying module for compulsorily transparentizing the white color in the raster image during the raster image is displayed.

One of the provided methods and devices may has at least one of the following advantages.

According to the present application, the raster image is built and the raster image is filled with a white color. The white color is transferred in a figure object described in a page and the figure object is inserted into the raster image. In this way, the white color filled in the raster image during building the raster image can be differentiated from that contained in the figure objects presented in the page, which will be inserted into the raster image later. During the raster image is displayed, the white color in the raster image is transparentized compulsively, so that the figure objects in the page can be displayed correctly. Thus, it is ensured that a displayed result of make-up is consistent with the actual result of make-up after the page in made-up.

DESCRIPTION OF THE PREFERRED EMBODIMENTS

The basic principle of the present invention is to build a raster image, fill raster image with white color, change white color in figure objects presented in a page to another color and insert figure objects into the raster image. In this way, the white color filled in the raster image during building the raster image can be differentiated from that contained in the figure objects presented in the page, which will be inserted into the raster image later.

During the raster image is displayed, the white color in the raster image is transparentized compulsively, so that the figure objects in the page can be displayed correctly. Thus, it is ensured that a displayed result of make-up is consistent with the actual result of make-up after the page in made-up.

Hereinafter, a detailed description of the present invention will be given with reference to the appended drawings and embodiments.

Embodiment 1

In this embodiment, all color values in a page contained in a page description file or page description flow input to an RIP are transferred, according to a transparency gray-scale transferring graph, and then the transferred result are output for display.

The transparency gray-scale transferring graph is a compensation mechanism for compensating errors caused during an imaging operation is performed in an output device. According to the conventional transparency gray-scale transferring graph, an input gray-scale 0% (i.e., a white color) needs not to be modified and thus its corresponding output gray-scale is also 0%. However, according to the transparency gray-scale transferring graph of this embodiment, output gray-scales corresponding to all input gray-scales (including the input gray-scale 0%) can not be 0%, since the white color can not be presented in the output page.

Figure 6:
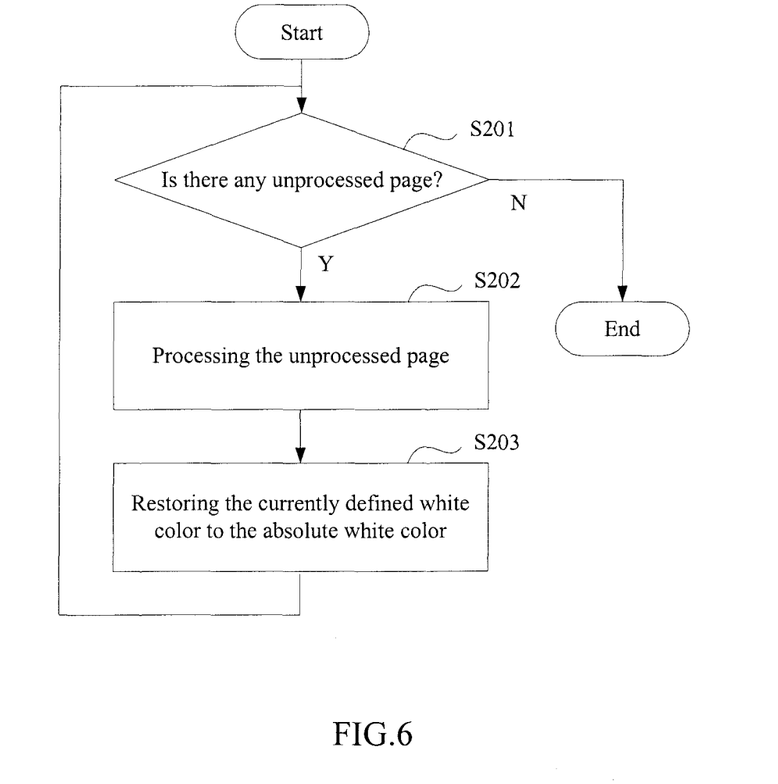
FIG. 6 is a flow chart for generating the preview of a page according to an embodiment of the present application.

In this embodiment, the RIP generates a preview for a page described by the page description file or the page description flow, after receiving the page description file or the page description flow. FIG. 6 illustrates a process for generating the preview, which comprises the following steps.

Step S201 is to determine whether an unprocessed page is contained in the page description file or the page description flow. If yes, the process turns to Step S202; otherwise, the process ends.

Step S202 is to perform a raster image processing for the unprocessed page.

Step S203 is to restore a currently defined white color to an absolute white color and then return to Step S201.

After one raster image processing is completed, an operating environment for the RIP is restored partially, for example, the currently defined white color is restored to the absolute white color.

Figure 7:
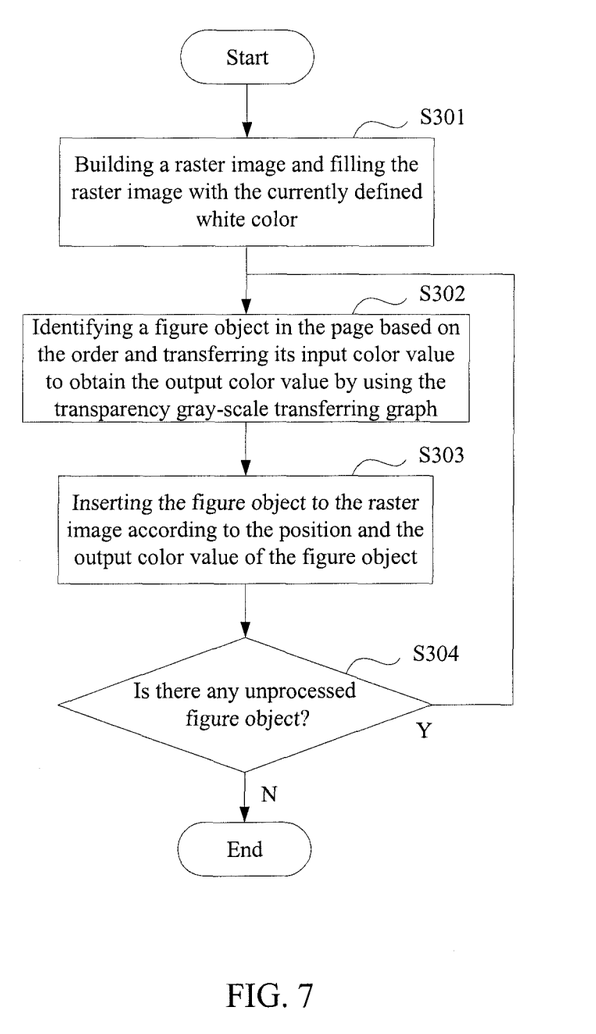
FIG. 7 is a flow chart of the raster image processing according to an embodiment of the present application.

FIG. 7 illustrates the above-mentioned raster image processing for the unprocessed page, which comprises the following steps.

In Step S301, the RIP builds a raster image based on page information of the unprocessed page and a color space for output, and fills the raster image with the currently defined white color.

The page information includes the size of the page and the resolution required for the raster image processing.

Step S302 is to identify the position and the input color value of a figure object in the page, based on the order of filling all the figure objects in the page. The order of filling is defined in the page description file or the page description flow. The input color value is transferred to obtain the output color value by using the transparency gray-scale transferring graph.

Each component of the input color value is transferred by using the respective transparency gray-scale transferring graph to obtain the corresponding component of the output color value.

Step S303 is to fill the raster image with the figure object according to the position and the output color value of the figure object.

Step S304 is to determine whether an unprocessed figure object is contained in the page. If yes, the process returns to Step S302; otherwise, the process ends.

The second display manner stated above is used to display the raster image obtained from the above process. The absolute white color in the raster image is transparentized compulsively, so that the figure objects in the page can be displayed correctly.

In this embodiment, the RIP processes only one physical page in one raster image processing, because the RIP in the raster image processing fills a raster image with the currently defined white color after the raster image is built. During the filling, for the first page in the page description file or the page description flow, the transparency gray-scale transferring graph does not work and the currently defined white color is set to the absolute white color. Thus, the white color filled in the raster image can be differentiated from that in the output figure object obtained by using the transparency gray-scale transferring graph. However, after the transparency gray-scale transferring graph works, the currently defined white color becomes the white color defined by the transparency gray-scale transferring graph and is different from the absolute white color. As a result, for pages other than the first one, the white color filled in respective raster images and that in the output figure object obtained by using the transparency gray-scale transferring graph are both defined by the transparency gray-scale transferring graph and thus can not be differentiated from each other. Therefore, in this embodiment, the RIP processes only one physical page in one raster image processing.

Since the output gray value corresponding to any input gray value can not be 0% according to the transparency gray-scale transferring graph in this embodiment, the white color will not be contained in the output colors of the figure objects corresponding to either page description manners.

Hereinafter, the page as shown in FIG. 1 is taken as an example for illustration again.

As for the first page description manner, the color values in the diamond will be changed due to the function of the transparency gray-scale transferring graph. If a white area exists in the diamond, it will become gray. Meanwhile, areas with any other colors will not be changed to a white area. Therefore, the diamond can be differentiated from a white area in the corresponding raster image, which is filled in the corresponding raster image before the diamond is filled therein.

As for the second page description manner, a white envelop rectangle will become gray due to the function of the transparency gray-scale transferring graph. If a white area exists in the diamond, it will also become gray. Meanwhile, areas with any other colors will also be changed due to the function of the transparency gray-scale transferring graph, but will never become white. Thus, both the envelop rectangle and the diamond can be differentiated from the white area in the corresponding raster image, which is filled in the corresponding raster image before the diamond is filled therein.

As a result, for both of the page description manners, each of the white areas contained in the figure objects described in the page description file can be differentiated from the white area filled in the raster image, which is filled in the raster image before the RIP fill the page with the figure objects. The second display manner is used for displaying the raster image by a computer graphic or image processing software. In this way, the white area in the raster image is transparentized compulsively. The compulsively transparentized white area is the area with the white color filled before the figure objects are inserted into the page. However, the white areas in the figure objects in the page are transferred to be gray and thus will not be transparentized compulsively. Therefore, the displayed page is consistent with that described in the page description file or the page description flow. During the make-up operation, the displayed result can be consistent with the result actually obtained by the RIP, since each displayed pages is consistent with its respective page described in the page description file or the page description flow.

In particular, the RIP can generate a preview of a page described in a received page description file or page description flow according to the following pseudocodes.

```
int pageNo = 0;              //preparing to process the first page
do{
    error = RIP ( PDLFileName,  //the name of the page description file
        transparency,            //the transparency gray-scale
                                 transferring graph
        pageNo,                  //the page specified in the raster image
                                 processing
        ...);                    //other RIP parameters
    pageNo ++;                   //preparing to process the next page
while ( error != NO_PAGE)}       //no any more page needs to be
                                 processed
```

Figure 8:
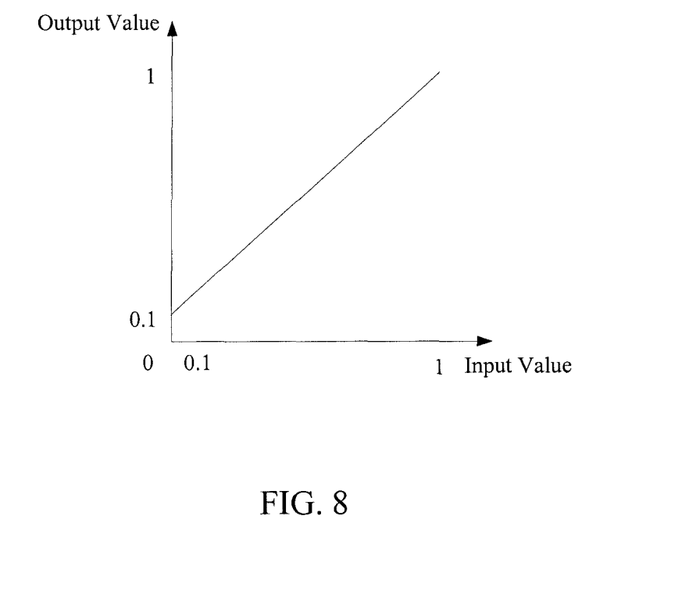
FIG. 8 is a schematic view of a transparency gray-scale transferring graph according to an embodiment of the present application.

In an example of this embodiment, the output color space is CMYK (Cyan, Magenta, Yellow, and blacK). The transparency gray-scale transferring graph for each component in the color space CMYK is identical, which is shown in FIG. 8. As shown in FIG. 8, when a component of an input color value is 0, a dot percent of the corresponding component of the output color value is 0.1 rather than 0. Hereinafter, the value for a component of a color value refers to the dot percent of the component. As a result, if an input color value is (C=0, M=0, Y=0, K=0) (i.e., the input color is the absolute white color), the output color value is (C=0.1, M=0.1, Y=0.1, K=0.1) (i.e., the absolute white color is transferred to be gray). It can be seen from the transparency gray-scale transferring graph as shown in FIG. 8 that each component of the output color value will never be 0 whatever the value of the corresponding component of the input color value is. Therefore, the white color is not contained in the output colors. In addition, since the RIP processes only one physical page in one raster image processing and the RIP fills a built raster image with the absolute white color having the color value (C=0, M=0, Y=0, K=0), the white area in the figure objects described in the page can be differentiated from that filled in the raster image before the page is filled with the figure objects.

The second display manner is used to display the raster image by a computer graphic or image processing software. After the white area in the raster image is transparentized compulsively, all figure objects in the page are presented in the displayed page correctly, preventing the displayed make-up result from being inconsistent with the result actually obtained by the RIP.

Taken the output color space CMYK as an example again, each component in the CMYK should be transferred by using the transparency gray-scale transferring graph during the page is displayed, so that each component in the output color value corresponding to the input absolute white color (C=0, M=0, Y=0, K=0) will never be 0. That is, according to the gray-scale transferring graph for each component, each component of the output value corresponding to any input value is different from the corresponding component in the output color space of the absolute white color. This is because that only one component of the color value is described in some page description files or page description flows. For example, if only the black component is described, the RIP will process only the black component when processing the page description file or the page description flow, without processing the cyan, magenta and yellow components. In this case, if an absolute white color with a color value (K=0) is contained in a page described in the page description file or the page description flow and the RIP only transfers the cyan component by using the transparency gray-scale transferring graph (instead of transferring each component in the CMYK by using the transparency gray-scale transferring graph), the RIP will not transfer the cyan component in an actual processing and the color value (K=0) will be maintained and thus is still the absolute white color. As a result, it can not differentiate the white color filled in a raster image during building the raster image and that in the figure objects filled in the raster image later. Therefore, each component in the output color space should be transferred to ensure that the white areas in the figure objects described in the page can be differentiated from the white areas filled in the raster image before the page is filled with the figure objects, so as to prevent the white areas in the figure objects from being displayed as the absolute white color and thus transparentized compulsively.

In this embodiment, the display result of the page only comprises the figure objects in the page and presents the page correctly. Since the transparency gray-scale transferring graph is used to transfer the color values in the page described in the page description file or the page description flow input into the RIP for outputting, the color values for the whole page are changed, in particular, to be gray, by comparing the displayed result with the actual page. Although the display result is somewhat different from the actual page in color, the difference therebetween is quite small for the user. Therefore, this embodiment brings a notable convenience for operations such as the make-up operation.

Embodiment 2

An important concept of the present application is to transfer the white areas in figure objects of a page to non-white areas, so that these areas will not be displayed as transparent areas. Accordingly, in this embodiment, the color of only the white areas in a page is changed rather than all the input colors in the page.

Figure 9:
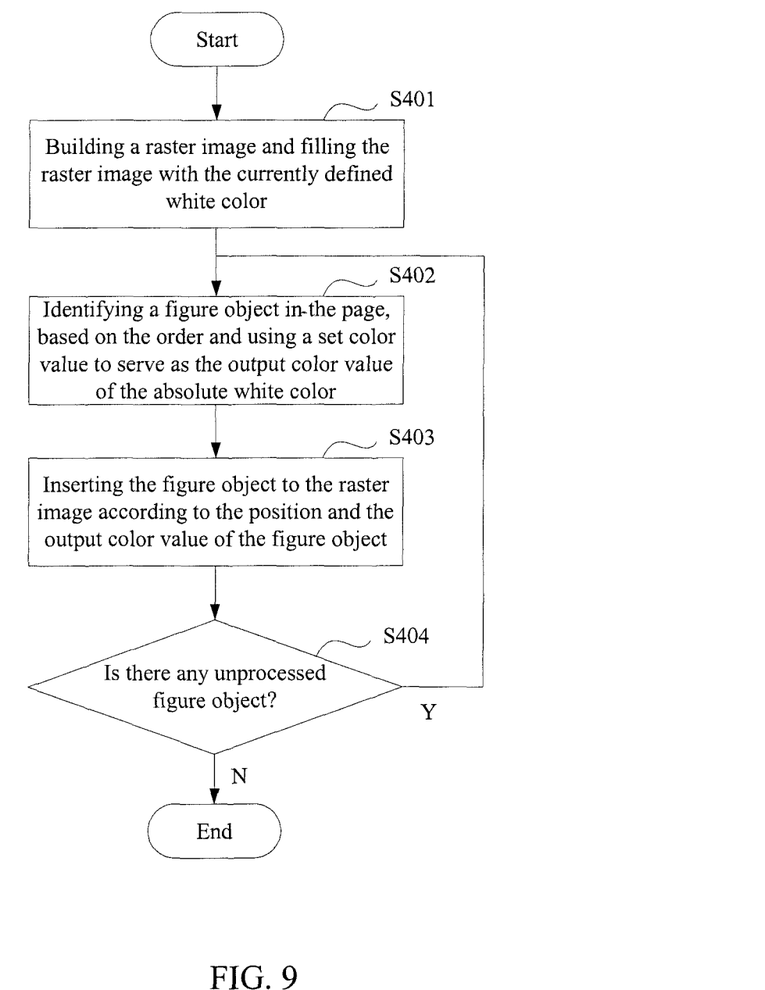
FIG. 9 is a flow chart of the raster image processing according to another embodiment of the present application.

In this embodiment, the RIP generates a preview for a page described by the page description file or the page description flow, after receiving the page description file or the page description flow. This process is identical to that of Embodiment 1, as shown in FIG. 3. However, the process for an unprocessed page in this embodiment is different from that of Embodiment 1. As shown in FIG. 9, the process according to this embodiment comprises the following steps.

In Step S401, the RIP builds a raster image based on page information of the unprocessed page and a color space for output, and fills the raster image with the currently defined white color.

Step S402 is to identify the position and the input color value of a figure object in the page, based on the order of filling all the figure objects in the page. The order of filling is defined in the page description file or the page description flow. A set color value is used to serve as the output color value corresponding to an input color value equal to the absolute white color. Any input color value different from the white color is directly served as its corresponding output color value.

The color value equal to the absolute white color is referred to that the value of each component of this color value is equal to that of the corresponding component of the absolute white color.

The value in each component of the set color value should not be equal to 0. For example, if the output color space is CMYK, the set color value is (C=0.1, M=0.2, Y=0.3, K=0.2).

In particular, the set color value may be close to the white color value so that the user has a more intuitionistic feeling. The set color value may also be an uncommon color value significantly different from the white color value. In this way, the user can know that an area with this uncommon color is white actually.

Step S403 is to fill the raster image with the figure object according to the position and the output color value of the figure object.

Step S404 is to determine whether an unprocessed figure object is contained in the page. If yes, the process returns to Step S402; otherwise, the process ends.

It is obvious that, according to this embodiment, the display result of the page only comprises the figure objects in the page and presents the page correctly. Although the display result is somewhat different from the actual page in color, this embodiment brings a notable convenience for operations such as the make-up operation.

Figure 10:
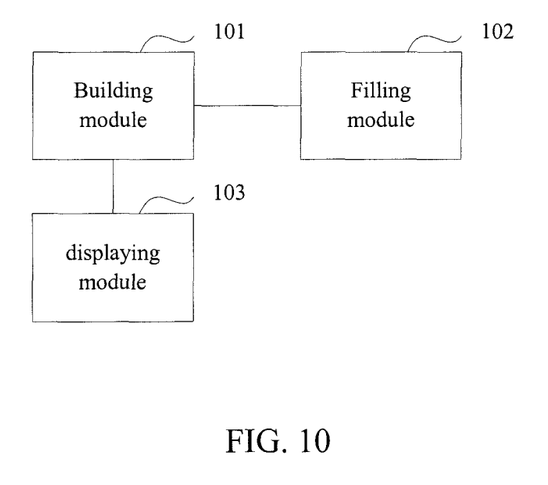
FIG. 10 is a block diagram of the raster image processing according to an embodiment of the present application.

FIG. 10 shows a raster image processing device according to an embodiment of the present invention, which comprises a building module 101 and a filling module 102.

The building module 101 builds a raster image and fills the raster image with the white color.

The filling module 102 transfers the white color in the figure objects described in a page and inserts the figure objects into the raster image built by the building module 101.

The raster image processing device may further comprise a displaying module 103 for compulsorily transparentizing the white color in the raster image during the raster image is displayed.

The present invention is not limited to the descriptions and embodiments mentioned above. Variations and modification made by those skilled in the art according to the disclosure herein should be within the scope of the present invention.

The invention claimed is:

1. A method for processing a raster image, comprising:
building the raster image and filling the raster image with a white color using a building module included in a processing device; and
transferring a white color in figure objects described in a page and inserting the figure objects into the raster image using a filling module included in a processing device;
wherein the white color is an absolute white color determined by an output color space, and
wherein, after the figure objects are inserted into the raster image, a currently defined white color from the transferring is restored to the absolute white color and a next page is awaited for processing.

2. The method according to claim 1, wherein the white color in the raster image is compulsorily transparentized by a displaying module included in a processing device while the raster image is displayed.

3. The method according to claim 1, wherein the raster image is built by the building module according to page information of the page and the output color space.

4. The method according to claim 1, wherein the step of transferring the white color in figure objects described in a page comprises:
identifying positions and input color values of the figure objects described in the page using the filling module; and
transferring, using the filling module, the input color value of the figure objects, which is identical to the white color value in the figure objects, by using a gray-scale transferring graph to obtain a corresponding output color value.

5. The method according to claim 4, wherein, when the input color value is transferred to obtain the corresponding output color value by using the gray-scale transferring graph, other input color values of other figure objects are also transferred by the filling module to obtain respective output color values by using the gray-scale transferring graph.

6. The method according to claim 4, wherein the step of transferring the input color value of figure objects by using a gray-scale transferring graph to obtain a corresponding output color value comprises:
transferring each component of the input color value using the filling module by using respective gray-scale transferring graph to obtain each component of the corresponding output color value.

7. The method according to claim 6, wherein each component of an output value corresponding to any input value is different from a corresponding component of the white color value in the output color space.

8. The method according to claim 1, wherein the step of transferring the white color in figure objects described in a page comprises:
identifying positions and input color values of the figure objects in the page using the filling module; and
using a set color value to serve as an output color value corresponding to the input color value equal to the white color value, using the filling module.

9. The method according to claim 8, wherein, when the set color value is used to serve as the output color value corresponding to the input color value equal to the white color value, input color values different from the white color value are directly served as respective output color values.

10. The method according to claim 8, wherein each component of the set color value is different from a corresponding component of the white color value in the output color space.

11. A device for processing a raster image, comprising:
a building module for building the raster image and filling the raster image with a white color; and
a filling module for transferring a white color in figure objects described in a page and inserting the figure objects into the raster image built by the building module;
wherein the white color is an absolute white color determined by an output color space; and wherein, after the figure objects are inserted into the raster image, a currently defined white color from the transferring is restored to the absolute white color and a next page is awaited for processing.

12. The device according to claim 11, further comprising:
a displaying module for compulsorily transparentizing the white color in the raster image while the raster image is displayed.

13. The method according to claim 5, wherein the step of transferring the input color value of figure objects by using a gray-scale transferring graph to obtain a corresponding output color value comprises:
transferring each component of the input color value using the filling module by using respective gray-scale transferring graph to obtain each component of the corresponding output color value.

14. The method according to claim 13, wherein each component of an output value corresponding to any input value is different from a corresponding component of the white color value in the output color space.

* * * * *